US008267521B2

(12) United States Patent
Maeda et al.

(10) Patent No.: US 8,267,521 B2
(45) Date of Patent: Sep. 18, 2012

(54) OPTICAL ELEMENT, ILLUMINATING DEVICE, AND PROJECTION TYPE VIDEO DISPLAY

(75) Inventors: Makoto Maeda, Osaka (JP); Takashi Ikeda, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 1165 days.

(21) Appl. No.: 11/511,218

(22) Filed: Aug. 29, 2006

(65) Prior Publication Data

US 2007/0052928 A1 Mar. 8, 2007

(30) Foreign Application Priority Data

Aug. 31, 2005 (JP) .................................. 2005-252697
Aug. 31, 2005 (JP) .................................. 2005-252713

(51) Int. Cl.
*G03B 21/14* (2006.01)
(52) U.S. Cl. ................ 353/20; 353/31; 353/34; 353/37; 353/81; 353/84; 353/94
(58) Field of Classification Search .................... 353/31, 353/20, 34, 37, 84, 81, 94; 359/890, 492, 359/502, 501, 498, 485.05, 487.03, 352; 349/5, 8, 9
See application file for complete search history.

(56) References Cited

U.S. PATENT DOCUMENTS

| | | | | | |
|---|---|---|---|---|---|
| 5,864,374 A | * | 1/1999 | Ito et al. | ......................... | 348/757 |
| 6,019,474 A | * | 2/2000 | Doany et al. | .................... | 353/33 |
| 6,097,546 A | * | 8/2000 | Yoshii et al. | ................... | 359/649 |
| 6,113,239 A | * | 9/2000 | Sampsell et al. | ................ | 353/31 |
| 6,176,586 B1 | | 1/2001 | Hirose et al. | | |
| 6,238,051 B1 | * | 5/2001 | Huang | ............................. | 353/81 |
| 6,379,010 B1 | * | 4/2002 | Suzuki et al. | ................... | 353/31 |
| 6,609,796 B2 | * | 8/2003 | Maki et al. | ...................... | 353/31 |
| 6,636,276 B1 | * | 10/2003 | Rosenbluth | ....................... | 349/8 |
| 6,637,891 B2 | * | 10/2003 | Na | ..................................... | 353/33 |
| 6,648,474 B2 | * | 11/2003 | Katsumata et al. | ............. | 353/20 |
| 6,819,365 B1 | * | 11/2004 | Peng | .................................. | 349/9 |
| 6,899,429 B2 | * | 5/2005 | Hamada et al. | ................. | 353/20 |

(Continued)

FOREIGN PATENT DOCUMENTS

JP 11-271683 A 10/1999

(Continued)

OTHER PUBLICATIONS

Chinese Office Action from corresponding case, dated Mar. 7, 2009.

(Continued)

*Primary Examiner* — Georgia Y Epps
*Assistant Examiner* — Sultan Chowdhury
(74) *Attorney, Agent, or Firm* — NDQ&M Watchstone LLP

(57) ABSTRACT

An optical element includes a dichroic surface formed by a multilayer dielectric film or the like and a polarized beam splitter surface formed by a multilayer dielectric film or the like. The dichroic surface transmits light (G and R) from a green wavelength band to a red wavelength band irrespective of the polarization directions of light, and reflects light (B) in a blue wavelength band. The polarized beam splitter surface reflects an S-polarized light (Gs) in a green wavelength band. Furthermore, the polarized beam splitter surface transmits an S-polarized light (Bs) and a P-polarized light (Bp) in the blue wavelength band, and also transmits the S-polarized light (Rs) and P-polarized light (Rp) in the red wavelength band.

4 Claims, 11 Drawing Sheets

U.S. PATENT DOCUMENTS

| | | | |
|---|---|---|---|
| 6,923,545 B2* | 8/2005 | Kitabayashi | 353/33 |
| 6,981,773 B2* | 1/2006 | Kamijima et al. | 353/81 |
| 7,434,945 B2* | 10/2008 | Maeda et al. | 353/99 |
| 2001/0015775 A1* | 8/2001 | Yamamoto et al. | 349/5 |
| 2002/0024742 A1* | 2/2002 | Sedlmayr | 359/641 |
| 2003/0011752 A1* | 1/2003 | Ikeda et al. | 353/31 |
| 2003/0107809 A1* | 6/2003 | Chen et al. | 359/498 |
| 2004/0184007 A1* | 9/2004 | Silverstein et al. | 353/20 |
| 2005/0068503 A1* | 3/2005 | Imade | 353/31 |
| 2005/0206849 A1* | 9/2005 | Inoue | 353/31 |
| 2005/0219468 A1* | 10/2005 | Yoshii et al. | 353/31 |
| 2005/0286023 A1* | 12/2005 | Kamm et al. | 353/20 |
| 2006/0082732 A1* | 4/2006 | Miwa et al. | 353/57 |
| 2006/0114423 A1* | 6/2006 | Maeda et al. | 353/94 |
| 2008/0100804 A1* | 5/2008 | Kanayama et al. | 353/20 |

FOREIGN PATENT DOCUMENTS

| | | |
|---|---|---|
| JP | 2000-081603 A | 3/2000 |
| JP | 2001-350132 A | 12/2001 |
| JP | 2002-162520 | 6/2002 |
| JP | 2004-117388 A | 4/2004 |

OTHER PUBLICATIONS

Japanese Office Action issued on Nov. 9, 2010 in the corresponding to Japanese Patent Application No. 2005-252697.

* cited by examiner (a)

(b)

A1: POLARIZATION DIRECTION OF IMAGE LIGHT INCIDENT ON OPTICAL ELEMENT 50
A2: ELEMENT FOR CONVERTING POLARIZATION DIRECTION BY 90 DEGREES IN FRONT OF OPTICAL ELEMENT
A3: ELEMENT FOR CONVERTING POLARIZATION DIRECTION BY 90 DEGREES IN FRONT OF DISPLAY PANEL

OPTICAL ELEMENT, ILLUMINATING DEVICE, AND PROJECTION TYPE VIDEO DISPLAY

BACKGROUND OF THE INVENTION

Field of the Invention

The present invention relates to an optical element for combining light by utilizing differences in wavelength and polarization of light, a illuminating device including the optical element, and a projection type video display including the illuminating device.

As the optical element for combining light by utilizing the difference in wavelengths of light, a cross dichroic prism, a cross dichroic mirror, and the like are known. As the optical element for combining light by utilizing the difference in polarization of light, a polarized beam splitter is known. A projection type video display using the cross dichroic prism or the polarized beam splitter is also known. A color separating/combining element which includes a polarization separation surface having selectivity on a predetermined wavelength, thereby reflecting an S-polarized light in a specific wavelength band, and includes another polarization separation surface for transmitting a P-polarized light and an S-polarized light in another wavelength band, thereby combining the lights is proposed (refer to Japanese Patent No. 3,609,715).

SUMMARY OF THE INVENTION

In the cross dichroic prism, however, at a time of combining red light, green light, and blue light, there is a case that utilization efficiency of green light is low (this case will be described in detail in an embodiment). And in the case of the polarized beam splitter, it cannot combine the lights from three directions. Furthermore, the color separating/combining element cannot be used only for color couplings.

An object of the present invention is to provide an optical element for combining lights by skillfully utilizing the differences both in wavelength and polarization of light with a relatively simple structure, a illuminating device including the optical element, and a projection type video display including the optical element or the illuminating device.

An optical element according to the present invention includes: a dichroic surface that transmits, out of light of a first color, light of a second color, and light of a third color which are different in color from one another, the light of the first color and the light of the second color and reflects the light of the third color, thereby leading the light of the first color and the light of the third color out of the light of the three colors to a specific optical path; and a polarized beam splitter surface that transmits, out of a first polarized light and a second polarized light of which polarization directions are orthogonal to each other, the first polarized light and reflects the second polarized light, the dichroic surface and the polarized beam splitter surface being disposed so as to cross each other, wherein the light of the second color of the second polarized light is led to the specific optical path by the polarized beam splitter surface (hereinbelow, called a first optical element in "summary of the invention").

An optical element according to the present invention includes: a dichroic surface that transmits, out of light of a first color, light of a second color, and light of a third color which are different in color from one another, the light of the first color and the light of the second color and reflects the light of the third color, thereby leading the light of the first color and the light of the third color out of the light of the three colors to a specific optical path; and a polarized beam splitter surface that transmits, out of a first polarized light and a second polarized light of which polarization directions are orthogonal to each other, the first polarized light and reflects the second polarized light, the dichroic surface and the polarized beam splitter surface being disposed so as to cross each other, wherein the polarized beam splitter surface functions as a polarized beam splitter only for the light of the second color, thereby leading the light of the second color of the second polarized light to the specific optical path and, even when the light of the first color and the light of the third color are the second polarized lights, the light of the first color and the light of the third color pass through the polarized beam splitter surface and travel to the specific optical path (hereinbelow, called a second optical element in "summary of the invention").

The first and second optical elements can combine lights by skillfully using the differences in wavelength and polarization of light with a relatively simple structure in which the dichroic surface and the polarized beam splitter surface are disposed so as to cross each other.

An illuminating device according to the present invention includes: the first optical element; and an optical system having three independently arranged solid light-emitting elements for emitting different color lights or an optical system that splits an output light of a white light source to the respective color lights, wherein each of the color lights is led to the specific optical path by the optical element, the second polarized light is used with respect to the light of the second color, and the first polarized light is used with respect to the light of the other two colors (hereinbelow, called a first illuminating device in "summary of the invention").

In the first illuminating device, a narrow wavelength band polarized light rotating element for rotating the polarization direction(s) of specific one or two color light(s) by 90 degrees may be provided on the specific optical path (hereinbelow, called a second illuminating device in "summary of the invention").

A projection type video display according to the present invention has the first illuminating device including the solid light-emitting elements, includes: a light source driver for pulse-driving each of the solid light-emitting elements of the illuminating device; a switching polarized light rotating element for switching between a function state where the polarization direction of incident light is rotated by 90 degrees and a function state where the polarization direction is not rotated by on and off of energization; a display panel for receiving light illuminated via the switching polarized light rotating element; a switch for controlling the switching polarized light rotating element in accordance with a timing that the solid light-emitting elements are pulse-driven, thereby aligning the polarization directions of all of the color lights to the same direction; a panel driver for supplying video signals for the respective colors to the display panel in accordance with a timing that the solid light-emitting elements are pulse-driven; and a projecting unit for projecting image light.

A projection type video display according to the present invention has the first illuminating device including the solid light-emitting elements, includes: a light source driver for pulse-driving each of the solid light-emitting elements of the illuminating device; a display panel of a liquid crystal type without an incident-side polarizer located on a position of receiving light emitted from the solid light-emitting elements; a panel driver, at the time that the first polarized light is incident on the display panel, for supplying to the display panel one of two video signals, that is, a video signal generated for a display panel in which a transmitting direction of incident light crosses a transmitting direction of a light output-side polarizer, and a video signal generated for a display panel in which the transmitting direction of the incident light is parallel with the transmitting direction of the light output-side polarizer, on the other hand, at the time that the second polarized light is incident on the display panel, for supplying to the display panel the other of the above-mentioned two video signals; and a projecting unit for projecting image light.

A projection type video display according to the present invention has the second illuminating device including the solid light-emitting elements, includes: a light source driver for pulse-driving each of the solid light-emitting elements of the illuminating device; a display panel for receiving light illuminated via the narrow wavelength band polarized light rotating element; a panel driver for supplying video signals for the respective colors to the display panel in accordance with a timing that the solid light-emitting elements are pulse-driven; and a projecting unit for projecting image light.

An illuminating device according to the present invention includes: the second optical element; and an optical system having three independently arranged solid light-emitting elements for emitting different color lights or an optical system that splits an output light of a white light source to the respective color lights, wherein each of the color lights is led to the specific optical path by the optical element, and the second polarized light is used with respect to at least the light of the second color (hereinbelow, called a third illuminating device in "summary of the invention").

A projection type video display according to the present invention has the third illuminating device including the solid light-emitting elements, includes: a light source driver for pulse-driving each of the solid light-emitting elements of the illuminating device; a display panel located on the specific optical path; a panel driver for supplying video signals for the respective colors to the display panel in accordance with a timing that the solid light-emitting elements are pulse-driven; and a projecting unit for projecting image light.

A projection type video display according to the present invention includes: the first optical element; three display panels for respective colors arranged to supply image light to three light incidence surfaces of the optical element; an optical system having three independently arranged solid light-emitting elements for emitting different color lights or an optical system that splits an output light of a white light source to the respective color lights; and a projecting unit for projecting image light, wherein image light emitted from the display panel for the light of the second color is the second polarized light, and image lights emitted from the other two display panels are the first polarized lights.

A projection type video display according to the present invention includes: the second optical element; three display panels for respective colors arranged to supply image light to three light incidence surfaces of the optical element; an optical system having three independently arranged solid light-emitting elements for emitting different color lights or an optical system that splits an output light of a white light source to the respective color lights; and a projecting unit for projecting image light, wherein out of color image lights emitted from the three display panels, the light of the second color is the second polarized light.

An illuminating device according to the present invention includes: the first optical element; and three lighting units for emitting color lights of three colors different from one another, wherein at least one of the lighting units is a time-sequential lighting unit having two solid light-emitting elements for emitting two color lights out of three color lights, and a dichroic member for combining the two color lights and emitting the combined light from one light emission side, and is controlled so as to emit the two color lights in a time-sequential manner, the light of the second color of the first polarized light and the light of the second color of the second polarized light traveling from directions orthogonal to each other are led to the specific optical path by the polarized beam splitter surface of the optical element, and the light of the second color of the second polarized light emitted from one of the lighting units is reflected by the polarized beam splitter surface, and the light of the second color of the first polarized light emitted from the time-sequential lighting unit passes through the polarized beam splitter surface (hereinbelow, called a fourth illuminating device in "summary of the invention").

A projection type video display according to the present invention includes the fourth illuminating device, wherein a single display panel is disposed on the light emission side of the optical element in the illuminating device and, by turning on the two lighting units other than the time-division lighting unit in the illuminating device in a time-sequential manner, three color lights are emitted in a time-sequential manner, and the display panel is driven by respective color video signals in accordance with the turn-on timings of the color lights emitted in the time-sequential manner.

In the projection type video display, a liquid crystal display panel may be used as the single display panel, and a polarization optical element for aligning polarization directions of respective color lights led to the liquid crystal display panel to the same direction or a liquid crystal display panel and a panel driver that can deal with light having different polarization directions may be provided.

A projection type video display according to the present invention includes: the fourth illuminating device; and three display panels for modulating light emitted from the respective lighting units, wherein the display panel for receiving the lights of the different two colors from the time-sequential lighting unit in the illuminating device is driven by video signals for the different two colors in accordance with the time-sequential lighting timings.

An illuminating device according to the present invention includes: the second optical element; and three lighting units for emitting color lights of three colors different from one another, wherein at least one of the lighting units is a time-sequential lighting unit having two solid light-emitting elements for emitting two color lights out of three color lights, and a dichroic member for combining the two color lights and emitting the combined light from one light emission side, and is controlled so as to emit the two color lights in a time-sequential manner, the light of the second color in the first polarized light and the light of the second color in the second polarized light traveling from directions orthogonal to each other are led to the specific optical path by the polarized beam splitter surface of the optical element, and the polarized beam splitter surface functions as a polarized beam splitter only for the light of the second color, so that even when the light of the first color and the light of the third color are the second polarized lights, the lights pass through the polarized beam splitter surface and are led to the specific direction, and the light of the second color of the second polarized light emitted from one of the lighting units is reflected by the polarized beam splitter surface, and the light of the second color of the first polarized light emitted from the time-sequential lighting unit passes through the polarized beam splitter surface (hereinbelow, called a fifth illuminating device in "summary of the invention").

A projection type video display according to the present invention includes the fifth illuminating device, wherein a single display panel is disposed on the light emission side of the optical element, two lighting units, too, other than the time-sequential lighting unit in the illuminating device are turned on in a time-sequential manner, thereby emitting three color lights in a time-sequential manner, and driving the display panel by respective color video signals in accordance with the turn-on timings of the color lights emitted in the time-sequential manner.

In the projection type video display, a liquid crystal display panel may be used as the single display panel, and a polarization optical element for aligning polarization directions of respective color lights led to the liquid crystal display panel to the same direction or a liquid crystal display panel and a panel driver that can deal with light having different polarization directions may be provided.

A projection type video display according to the present invention includes: the fifth illuminating device; and three display panels for modulating light emitted from the respective lighting units, wherein the display panel for receiving color lights of the different two colors from the time-sequential lighting unit is driven by video signals for the different two colors in accordance with the time-sequential light emission timings.

An illuminating device according to the present invention includes: the first optical element; and three lighting units for emitting color lights of three colors different from one another, wherein at least one of the lighting units is a time-sequential lighting unit having two solid light-emitting elements for emitting two color lights out of three color lights, an optical system part for emitting the two color lights so that the polarization directions of the output lights are different from each other, and a polarization beam combining unit for combining the two color lights of which polarization directions are different from each other and emitting the combined light from one light emission side, and is controlled so as to emit the two color lights in a time-sequential manner, the light of the second color in the first polarized light and the light of the second color in the second polarized light traveling from directions orthogonal to each other are led to the specific optical path by the polarized beam splitter surface of the optical element, and the light of the second color in the second polarized light emitted from one of the lighting units is reflected by the polarized beam splitter surface, and the light of the second color of the first polarized light emitted from the time-sequential lighting unit passes through the polarized beam splitter surface (hereinbelow, called a sixth illuminating device in "summary of the invention").

A projection type video display according to the present invention includes the sixth illuminating device, wherein a single display panel is disposed on the light emission side of the optical element, and two lighting units other than the time-sequential lighting unit in the illuminating device are turned on in a time-sequential manner, thereby emitting three color lights in a time-sequential manner, a panel driver for driving the display panel by respective color video signals in accordance with the turn-on timings of the color lights emitted in the time-sequential manner is provided, and the time-sequential lighting unit has a polarization optical element for aligning polarization directions of the light of the second color and the other colors to the first polarized light.

In the projection type video display, a liquid crystal display panel may be used as the single display panel, and a polarization optical element for aligning polarization directions of respective color lights led to the liquid crystal display panel to the same direction or a liquid crystal display panel and a panel driver that can deal with light having different polarization directions may be provided.

A projection type video display according to the present invention includes: the sixth illuminating device; and three display panels for modulating light emitted from the respective lighting units, wherein the display panel for receiving color lights of the different two colors from the time-sequential lighting unit is driven by video signals for the different two colors in accordance with the time-sequential light emission timings.

An illuminating device according to the present invention includes: the second optical element; and three lighting units for emitting color lights of three colors different from one another, wherein at least one of the lighting units is a time-sequential lighting unit having two solid light-emitting elements for emitting two color lights out of three color lights, an optical system part for emitting the two color lights so that the polarization directions of the output lights are different from each other, and a polarization beam combining unit for combining the two color lights of which polarization directions are different from each other and emitting the combined light from one light emission side, and is controlled so as to emit the two color lights in a time-sequential manner, the light of the second color in the first polarized light and the light of the second color in the second polarized light traveling from directions orthogonal to each other are led to the specific optical path by the polarized beam splitter surface, the polarized beam splitter surface functions as a polarized beam splitter only for the light of the second color, so that even when the light of the first color and the light of the third color are the second polarized lights, the lights pass through the polarized beam splitter surface and are led to the specific direction, and the light of the second color of the second polarized light emitted from one of the lighting units is reflected by the polarized beam splitter surface, and the light of the second color of the first polarized light emitted from the time-sequential lighting unit passes through the polarized beam splitter surface (hereinbelow, called a seventh illuminating device in "summary of the invention).

A projection type video display according to the present invention includes the seventh illuminating device, wherein a single display panel is disposed on the light emission side of the optical element, two lighting units other than the time-sequential lighting unit in the illuminating device are turned on in a time-sequential manner, thereby emitting three color lights in a time-sequential manner, and a panel driver for driving the display panel by respective color video signals in accordance with the turn-on timings of the color lights emitted in the time-sequential manner is provided.

In the projection type video display, a liquid crystal display panel may be used as the single display panel, and a polarization optical element for aligning polarization directions of respective color lights led to the liquid crystal display panel to the same direction or a liquid crystal display panel and a panel driver that can deal with light having different polarization directions may be provided.

A projection type video display according to the present invention includes: the seventh illuminating device; and three display panels for modulating light emitted from the respective lighting units, wherein the display panel for receiving color lights of the different two colors from the time-sequential lighting unit is driven by video signals for the different two colors in accordance with the time-sequential light emission timings.

As described above, light can be combined by skillfully using the differences in wavelength and polarization of light with a relatively simple structure. For example, an effect can be obtained such that the amount of light can be increased by decreasing a loss of the light at both side of the available wavelength which is cut by the conventional cross dichroic mirror.

The above and other objects, features, modes, and advantages of the present invention will become more apparent from the following detailed description with reference to the appended drawings.

DESCRIPTION OF THE PREFERRED EMBODIMENTS

First Embodiment

An optical element, an illuminating device, and a projection type video display of a first embodiment of the invention will be described hereinbelow with reference to FIGS. 1 to 11.

Figure 1:
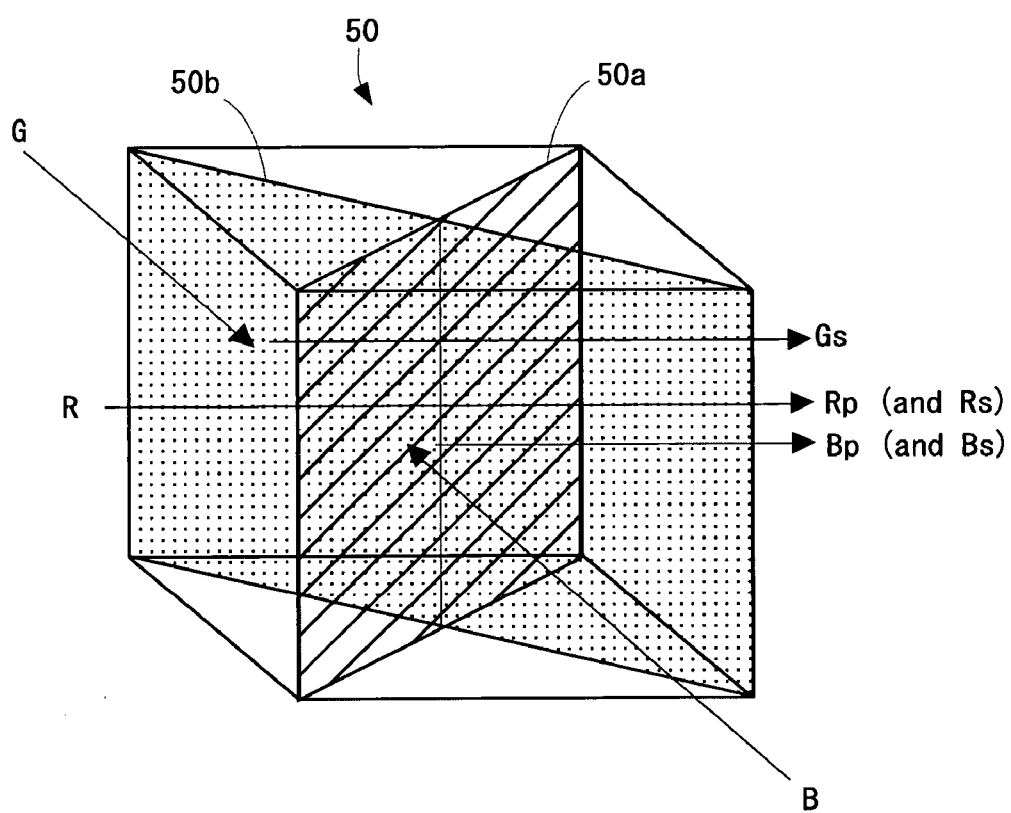
FIG. 1 is a perspective view showing an optical element of an embodiment of the invention.
Figure 2:
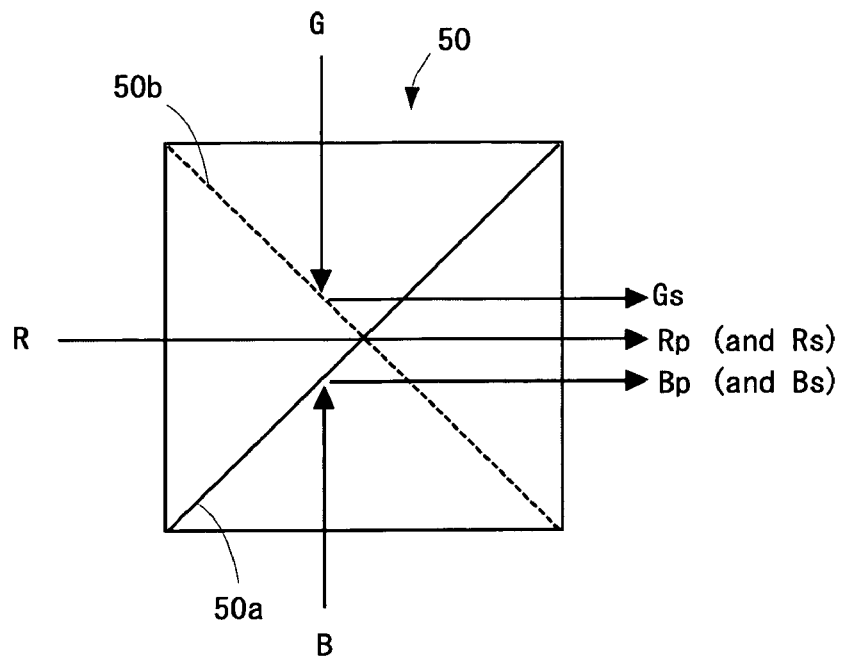
FIG. 2 is a plan view of the optical element of FIG. 1.

As shown in FIGS. 1 and 2, an optical element 50 of the present invention includes, in a transparent glass cube, a dichroic surface 50a formed by a multilayer dielectric film or the like on a division surface which divides the cube into two triangular prisms, and a polarized beam splitter surface 50b made by a multilayer dielectric film or the like formed on another division surface. The dichroic surface 50a transmits light (G and R) from the green wavelength band to the red wavelength band irrespective of the beam polarization direction and reflects light (B) in the blue wavelength band. The polarized beam splitter surface 50b reflects an S-polarized light (Gs) in the green wavelength band (and transmits a P-polarized light in the green wavelength band). Furthermore, the polarized beam splitter surface 50b transmits an S-polarized light (Bs) and a P-polarized light (Bp) in the blue wavelength band and also transmits an S-polarized light (Rs) and a P-polarized light (Rp) in the red wavelength band. The optical element 50 is formed by attaching two surfaces, on the apex side of an isosceles triangle, each of four transparent triangular prisms, thereby having a cube shape.

Figure 3:
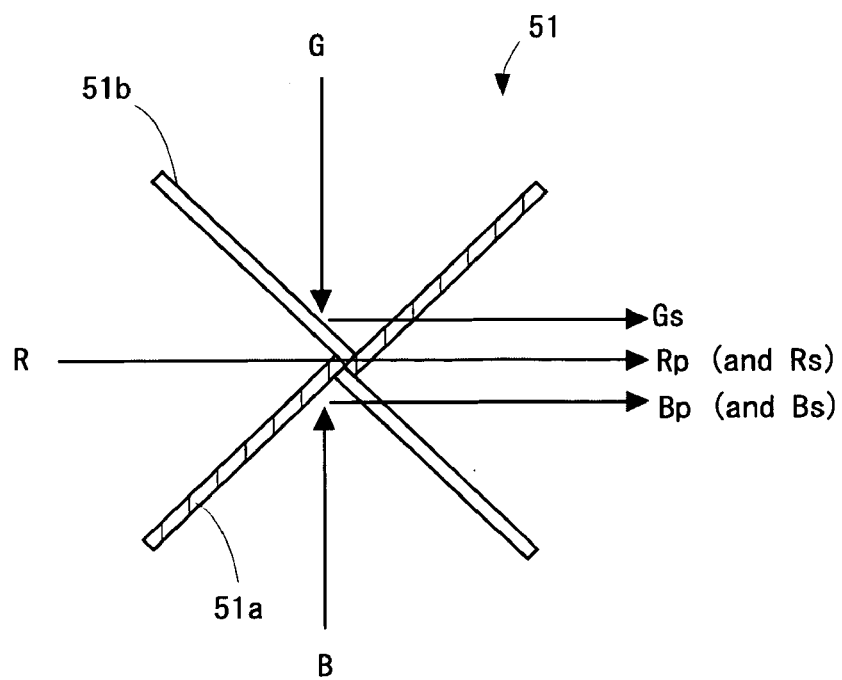
FIG. 3 is a plan view showing an optical element of another embodiment of the invention.

As shown in FIG. 3, an optical element 51 of the present invention has a dichroic mirror 51a made by a multilayer dielectric film or the like and a polarized beam splitter 51b made by a multilayer dielectric film or the like. The dichroic mirror 51a transmits light (G and R) from the green wavelength band to the red wavelength band irrespective of the light polarization direction and reflects light (B) in the blue wavelength band. The polarized beam splitter 51b reflects an S-polarized light (Gs) in the green wavelength band (and transmits a P-polarized light in the green wavelength band). Furthermore, the polarized beam splitter 51b transmits an S-polarized light (Bs) and a P-polarized light (Bp) in the blue wavelength band and also transmits an S-polarized light (Rs) and a P-polarized light (Rp) in the red wavelength band. In the optical element 51, each of the dichroic mirror 51a and the polarized beam splitter 51b is divided into two parts. The edges of the four divided parts are disposed close to each other, thereby forming a cross shape. It is also possible to divide one of the dichroic mirror 51a and the polarized beam splitter 51b into two parts and dispose so as to sandwich the other one by the two divided parts, thereby forming a cross shape.

Figure 4:
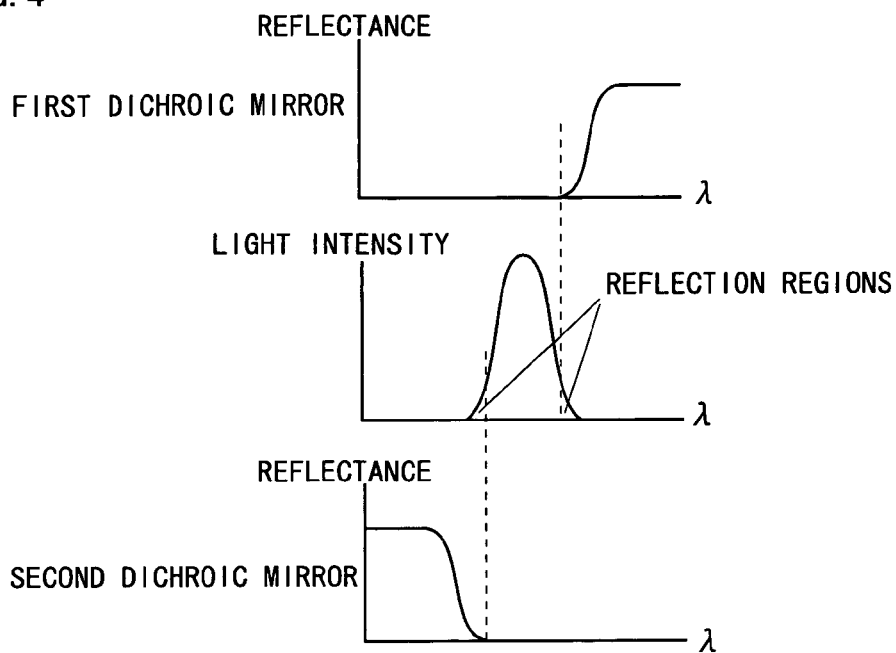
FIG. 4 is a diagram for explaining the characteristics of a general dichroic mirror.
Figure 5:
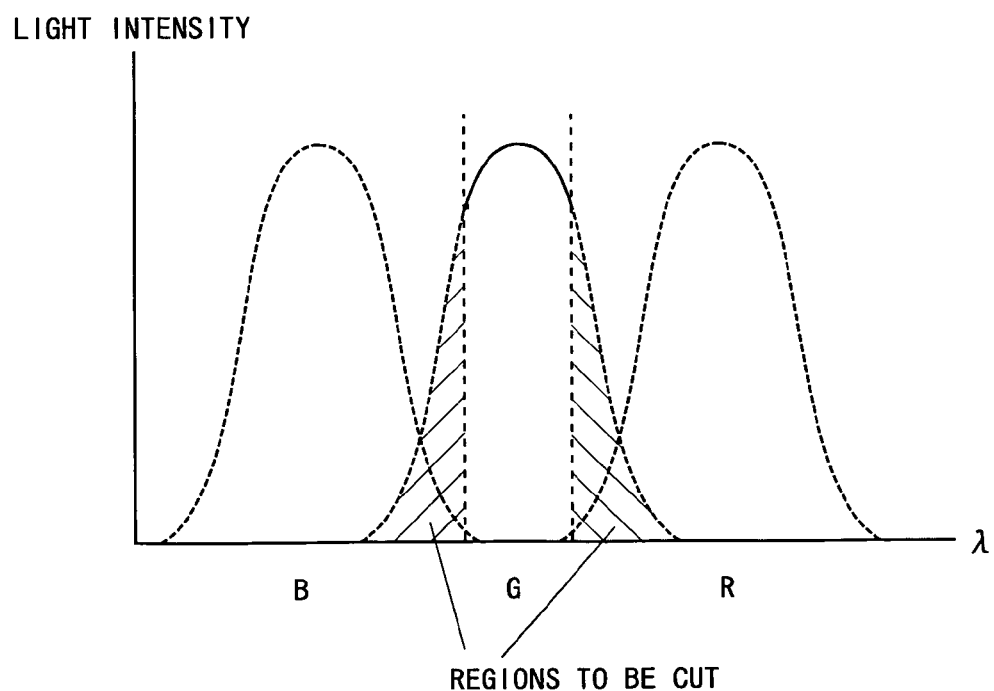
FIG. 5 is a diagram illustrating reduction of the amount of green light by a general dichroic mirror.

With respect to a normal cross dichroic mirror and the like, the characteristic of a first dichroic mirror (wavelength reflection characteristic) is a characteristic of reflecting light in the red wavelength band as shown in the upper part of FIG. 4, and the characteristic of a second dichroic mirror (wavelength reflection characteristic) is a characteristic of reflecting light in the blue wavelength band in the lower stage of FIG. 4. Consequently, a part of both sides of the wavelengths of green light in the intermediate wavelength band is reflected (cut), so that the efficiency for light utilization of green light deteriorates.

In contrast, in the optical elements 50 and 51, the dichroic surface 50a and the dichroic mirror 51a transmit light from the green wavelength band to the red wavelength band and reflect light in the blue wavelength band in color light incident on the three light incidence surfaces. The beam splitter surface 50b and the beam splitter 51b do not have a characteristic of color light cutting. Consequently, the wavelength part on the side close to red light in the green wavelength band is not cut, and efficiency for light utilization of green light improves.

The illuminating device using the optical element 50 or 51 can emit each of the color lights aligned to the S-polarized light (color video lights in a projector which will be described later) in a single direction (specific optical path). In the case of supplying color lights from color light sources (solid light-emitting elements) as they are (without aligning the polarization directions) to the optical element 50 (51), the red and blue light including its P-polarized lights is emitted to the specific optical path. In the case where color lights from the color light sources (solid light-emitting elements) are aligned to the S-polarized light by a polarization converter (polarization optical element) and supplied to the optical element 50 (51), the color lights aligned to the S-polarized light can be emitted in a single direction (specific optical path). In the case where color light from the green light source (solid light-emitting element) is aligned to the S-polarized light by the polarization converter and supplied to the optical element 50 (51), and color lights from the red light source and the blue light source (solid light-emitting elements) are aligned to the P-polarized light by the polarization converter and supplied to the optical element 50 (51), light in which the green light is the S polarized light and the other color lights are P-polarized lights is emitted toward the specific optical path.

In the case of using a general polarized beam splitter (which is not limited to a bandwidth) in place of the polarized beam splitter surface 50*b* or the polarized beam splitter 51*b*, the green light as the S-polarized light and other color lights as P-polarized lights are emitted toward a specific optical path. Such an optical element is also included in the present invention. The optical element 51 has a configuration similar to such an optical element. Such an optical element will be also referred to as 50'.

The type in which all of color lights are led in the state of the S-polarized lights to a specific optical path is called a type A. A device in which unmodulated lights are led to three surfaces of the optical element is called a type-A illuminating device, and a projector in which modulated light (respective color video lights) is led to the three surfaces of the optical element is called a 3-panel type-A projector. A type in which the color lights are led to a specific optical path in a state where an S-polarized light and a P-polarized light mixedly exist is called a type B. A device in which unmodulated lights are led to the optical element is called a type-B illuminating device, and a projector in which modulated lights (respective color video lights) are led to the optical element is called a 3-panel type-B projector.

Figure 6:
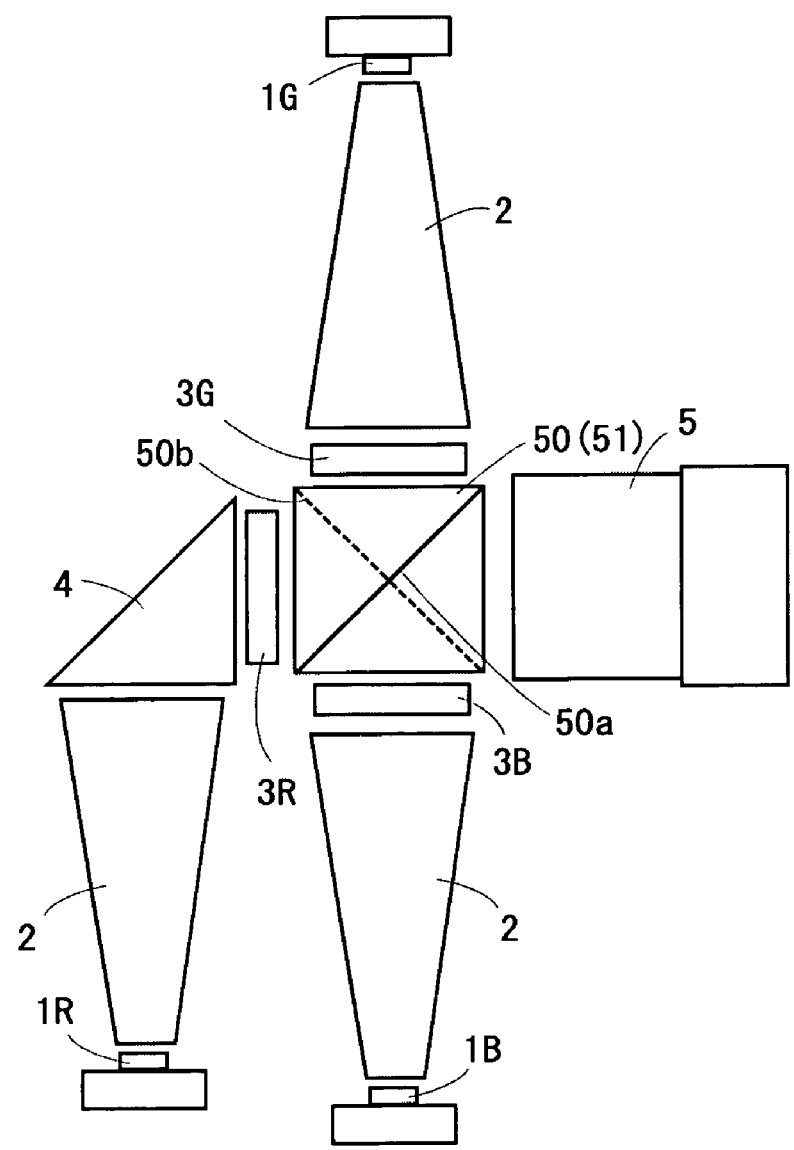
FIG. 6 is a diagram illustrating an illuminating device and a projector of an embodiment of the invention.

FIG. 6 is a diagram illustrating an example of the 3-panel type-A projector. Light emitted from a green solid light-emitting element (for example, green LED) 1G is subjected to light integration and reduction of the divergence angle by a tapered rod 2, and the converted light is led to a liquid crystal display panel 3G for green. In the example, by providing a wire grid type polarized beam splitter (polarization optical element) on the light emission side of the tapered rod 2, only predetermined polarization light is emitted. Obviously, a polarization converter constructed by a polarized beam splitter array may be used. The other color light source systems are similarly constructed. Modulated light (S-polarized light) obtained by the liquid crystal display panel 3G is reflected by the polarized beam splitter surface 50*b* and led to a projection lens 5. Light emitted from a blue solid light-emitting element (for example, blue LED) 1B is subjected to light integration and reduction of the divergence angle by the tapered rod 2 and the converted light is led to a liquid crystal display panel 3B for blue. Modulated light (S-polarized light) obtained by the liquid crystal display panel 3B is reflected by the dichroic surface 50*a* and passes through the polarized beam splitter surface 50*b*, and the modulated light is led to the projection lens 5. Light emitted from a red solid light-emitting element (for example, red LED) 1R is subjected to light integration and reduction of the divergence angle by the tapered rod 2, its optical path is changed by 90° by an optical path change prism 4, and the converted light is led to a liquid crystal display panel 3R for red. Modulated light (S-polarized light) obtained by the liquid crystal display panel 3R passes through the dichroic surface 50*a* and the polarized beam splitter surface 50*b* is led to the projection lens 5.

In a conventional liquid crystal projector, the liquid crystal display panel for green is provided in a position to face the projection lens. However, in such an arrangement, in the case of generating a white light considered a white balance, there may be a case where the light amount of green light is apt to come short relatively in necessary light amount of each color light. When the optical path of green light is changed by the optical path change prism 4, the light amount of green light further decreases. In the 3-panel type-A projector shown in FIG. 6, the optical path of green light is not changed by the optical path change prism 4, so that the light amount of green light can be prevented from decreasing. Since the other optical paths of the color lights except the green light are changed by the optical path change prism 4, the advantage of downsizing achieved by using the optical path change prism 4 can be obtained.

It is now assumed that the total light amount is determined by the green light. The light amount of the conventional configuration (the configuration of combining the color lights by the dichroic cross prism) and that of the projector of FIG. 6 will be compared with each other. First, the efficiency for light utilization by the rod integrator (hereinbelow, simply called efficiency) is set as $\eta$rod, efficiency of the projection lens 5 is set as $\eta$PL, efficiency of combination of the liquid crystal display panel 3 and its polarizing plate is set as $\eta$LCD, and those elements are common to both of the systems. Next, the reflectance of the optical path change prism 4 is set as $\eta$m, transmittance of the dichroic cross prism (conventional configuration) is set as $\eta$D, and reflectance of the polarized beam splitter surface 50*b* is set as $\eta$GP. Numerical values of $\eta$m, $\eta$D, and $\eta$GP are about 0.9, 0.99, and 0.99, respectively. When the light emission amount of the light source 1 is set as L and the amount of light reaching a screen is calculated, the efficiency $\eta$C of the conventional configuration and the efficiency $\eta$n of the present invention are obtained as follows.

$$\eta C = \eta PL \times \eta LCD \times \eta \text{rod} \times \eta m \times \eta D \times L$$

$$\eta n = \eta PL \times \eta LCD \times \eta \text{rod} \times \eta GP \times L$$

$$\eta n / \eta C = \eta GP / (\eta m \times \eta D) = \text{about } 1.1$$

Therefore, the screen of the present invention is brighter.

The 3-panel type-A projector is not limited to have the optical path change prism 4.

As the 3-panel B-type projector, a projector having a configuration similar to that shown in FIG. 6 can be used. Another configuration may be employed in which when green image light is an S-polarized light and the other image lights are P-polarized lights, for example, a narrow-wavelength-band polarized light rotating element for rotating the polarization direction of only light in the green wavelength band by 90° is provided on the light incidence side of the projection lens 5. When a color light is the first polarized light and the other two color lights are the second polarized light, a narrow-wavelength-band polarized light rotating element for the certain color light or the other two color lights may be provided. The 3-panel type-B projector, too, is not limited to have the optical path change prism 4.

Figure 7:
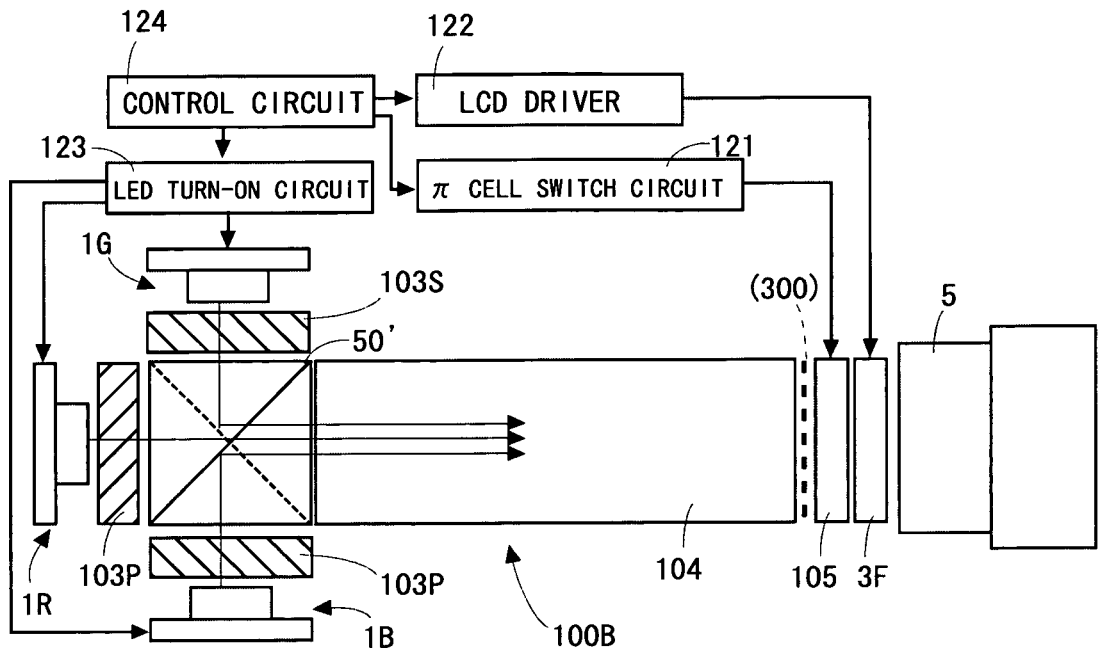
FIG. 7 is a diagram illustrating an illuminating device and a projector of another embodiment of the invention.

FIG. 7 is a diagram illustrating an example of a time-sequential-driving-type projector using a type-B illuminating device. Green light emitted from the green solid light-emitting element 1G is converted to an S-polarized light by a polarization converter 103S. Red light emitted from the red solid light-emitting element 1R is converted to a P-polarized light by a polarization converter 103P. Blue light emitted from the blue solid light-emitting element 1B is converted to a P-polarized light by the polarization converter 103P. The light sources 1R, 1G, and 1B are driven in a time-sequential manner by an LED turn-on circuit 123. A $\pi$ cell (switching polarized light rotating element) 105 is disposed on the light emission side of a rod integrator 104. The $\pi$ cell 105 has a structure corresponding to a structure obtained by, for example, eliminating a polarizer from a liquid crystal display panel, and a function state in which the polarization direction of incident light is rotated by 90 degrees and a function state in which the polarization direction is not rotated are switched by on and off of an energization. For example, in a state where the light source 1R or 1B is on (in a state where a P-polarized light is supplied to the π cell 105 via the rod integrator 104), voltage is not applied from a π cell SW circuit 121 to the π cell 105 (turn-off state). In this case, the π cell 105 converts the received P-polarized light to the S-polarized light. On the other hand, in a state where the light source 1G is on (in a state where S-polarized light is supplied to the π cell 105 via the rod integrator 104), voltage is supplied to the π cell 105 (turn-on state). In this case, the π cell 105 transmits the received S-polarized light as it is. As a result, the P-polarized light and S-polarized light from the color light sources are uniformed by the π cell 105 to one of them (S-polarized light in the above case).

Figure 8:
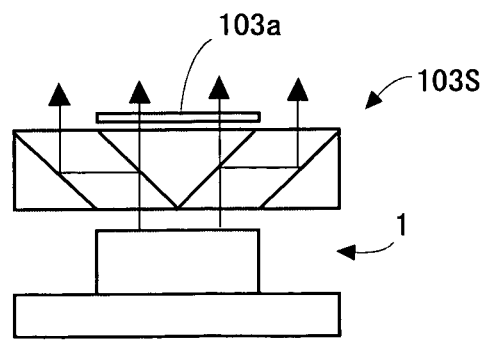
FIG. 8 is a diagram illustrating a polarization converter (polarization optical element).

The polarization converter 103S is constructed by a polarized beam splitter array (hereinbelow, called PBS array) as shown in FIG. 8. Each of the polarization separation films in the PBS array transmits, for example, P-polarized light in light from the light source 1 and changes the optical path of S-polarized light by 90°. The S-polarized light whose optical path is changed is reflected by the adjoining polarization film (or reflection film) and goes out as it is. On the other hand, the P-polarized light which passes through the polarization separation film is converted to an S-polarized light by a retardation film (½λ plate) 103a and the S-polarized light goes out. In this case, all of light is converted to S-polarized light. The polarized beam splitter is constructed by a so-called wire grid polarizer, a polarization separation multilayer film, or the like. The polarization converter 103P may be obtained by shifting the position of the retardation films (½λ plate) 103a to the outside (each side) in the polarization converter 103S. Using the polarization converter 103P will convert all of light to P-polarized light, that is, the function of conversion of the polarization converter 103P is the reverse of the function of conversion of the polarization converter 103S. In this case, light which is a P-polarized light for the polarized beam splitter surface in an optical element 50' shown in FIG. 7 is supplied from the polarization converter 103P for the red light source 1R. Similarly, light which is a P-polarized light for the polarized beam splitter surface in the optical element 50' is supplied from the polarization converter 103P for the blue light source 1B.

A liquid crystal display panel 3F is a transmission-type liquid crystal display panel. An incident-side polarizer of the liquid crystal display panel 3F transmits an S-polarized light. The liquid crystal display panel 3F is driven by an LCD driver 122. The light sources 1R, 1G, and 1B are driven with pulses while shifting the phases by 120° by the LED turn-on circuit 123. The LCD driver 122, LED turn-on circuit 123, and π cell switch circuit 121 are controlled by a control circuit 124. Although the π cell 105 is shown as a switching polarized light rotating element, the invention is not limited to the element. Although the case of unifying the P-polarized light and the S-polarized light to either P-polarized light or S-polarized light has been described, the invention is not limited to the case but it is sufficient to unify the polarization directions of light from the color light sources. For example, in the case where the light incident/outgoing polarization direction of the liquid crystal display panel is 45°, the configuration of unifying the S-polarized light and the P-polarized light to either the P-polarized light or S-polarized light is not employed. For example, a half-wave plate is disposed between the π cell 105 and the optical element 50' to unify the light to the light in the polarization direction corresponding to 45°.

As the projector of the time-sequential drive type using the type-A illuminating device, a projector having a configuration similar to that shown in FIG. 7 can be also used, by replacing the optical element 50' with the optical element 50. In this case, the π cell 105 and the π cell switch circuit 121 are unnecessary. Light which is an S-polarized light for the polarized beam splitter surface in the optical element 50 is supplied from the polarization converter for the red light source 1R. Similarly, light which is an S-polarized light for the polarized beam splitter surface in the optical element 50 is supplied from the polarization converter for the blue light source 1B.

In the projector of the time-sequential drive type using the type-B illuminating device shown in FIG. 7, by providing a narrow-wavelength-band polarized light rotating element at any portion between the optical element 50' and the liquid crystal display panel 3F, a configuration which does not require the π cell 105 and the π cell switch circuit 121 can be realized.

Figure 9:
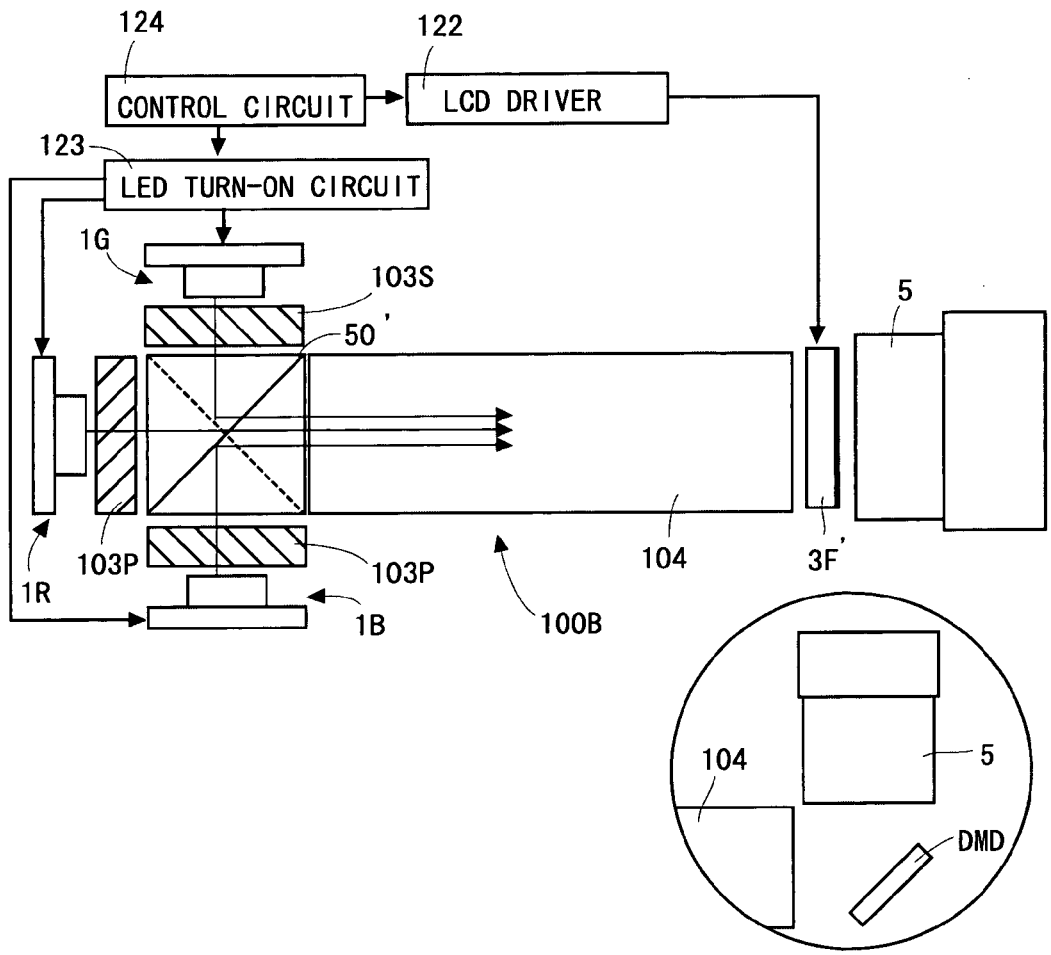
FIG. 9 is a diagram illustrating an illuminating device and a projector of another embodiment of the invention.

FIG. 9 is a diagram illustrating an example of a projector of the time-sequential drive type using the type-B illuminating device. Green light emitted from the green solid light-emitting element 1G is converted to an S-polarized light by the polarization converter 103S. Red light emitted from the red solid light-emitting element 1R is converted to a P-polarized light by the polarization converter 103P. Blue light emitted from the blue solid light-emitting element 1B is converted to a P-polarized light by the polarization converter 103P. The projector has the liquid crystal display panel 3F'.

Figure 10:
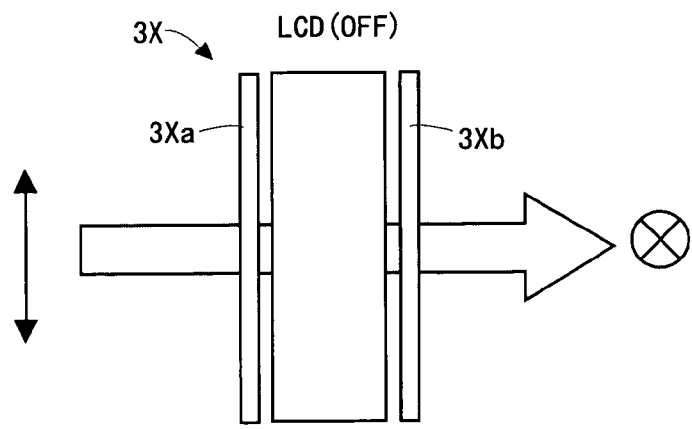
FIG. 10 is a diagram illustrating a liquid crystal display panel.

FIG. 10 shows the structure of a liquid crystal display panel 3X of a general normally-white type. An incidence-side polarizer 3Xa and an output-side polarizer 3Xb of the liquid crystal display panel 3X are disposed so that their light transmission polarization directions are different from each other by 90°. When current to pixels in the liquid crystal display panel 3X is not passed, the polarization direction of incident light is shifted by 90° and the incident light goes out from the output-side polarizer 3Xb, so that a white image is displayed. On the contrary, when current is passed to the pixels, the polarization of incident light does not rotate, so that the incident light cannot pass through the output-side polarizer 3Xb and a black image is displayed.

The structure of the liquid crystal display panel 3F' corresponds to a structure obtained by eliminating the incident-side polarizer from the liquid crystal display panel 3X. The LCD driver 122 switches between supply of a video signal in the case where the liquid crystal display panel 3F' is regarded as a liquid crystal display panel of the normally-white type and supply of a video signal in the case where the liquid crystal display panel 3F' is regarded as a liquid crystal display panel of the normally-black type in accordance with timings of switching of light of the color light sources (switch between the P-polarized light and the S-polarized light). Specifically, when a polarized light in the first direction is incident on the liquid crystal display panel 3F', the LCD driver 122 supplies to the liquid crystal display panel 3F' one of a video signal generated for a liquid crystal display panel in which the polarization direction on the incidence side crosses the polarizer on the emission side and a video signal generated for a liquid crystal display panel in which the polarization direction on the incidence side is parallel with the polarizer on the emission side. On the other hand, when the polarized light in the second direction is incident on the liquid crystal display panel 3F', the LCD driver 122 supplies the other video signal to the liquid crystal display panel.

In the following, description will be given more concretely. In the following description, it is assumed that the output-side polarizer of the liquid crystal display panel 3F' transmits the S-polarized light. At a timing when the red light source 1R is on and the P-polarized light is emitted, the LCD driver 122 supplies the red video signal for the normally-white type to the liquid crystal display panel 3F'. When a video signal corresponding to 100% of red is supplied to the liquid crystal display panel 3F' (that is, current is not passed to the pixels in the liquid crystal display panel 3F'), the polarization direction of the P-polarized light incident on the liquid crystal display panel 3F' is rotated by 90° and the P-polarized light becomes S-polarized light, so that the output light can pass through the output-side polarizer, and an image of 100% of red is displayed. Also at a timing when the blue light source 1B is turned on, a control similar to the above-described control is executed. On the other hand, at a timing when the green light source 1G is on and the S-polarized light is emitted, the LCD driver 122 supplies a video signal for the normally-black type to the liquid crystal display panel 3F'. When a video signal corresponding to an image of 100% of green is supplied to the liquid crystal display panel 3F' (that is, current is passed to the pixels in the liquid crystal display panel 3F'), the S-polarized light incident on the liquid crystal display panel 3F' does not rotate, so that the light can pass through the output-side polarizer and an image of 100% of green is displayed.

That is, in the projector shown in FIG. 9, the LCD driver 122 switches between the supply of the video signal for the normally-white type and the supply of the video signal for the normally-black type in accordance with the timing of turn-on of the light source 1, and the two video signals are supplied to the liquid crystal display panel 3F' (having no incident-side polarizer). Thus, video display can be realized without using the π cell 105.

Although the case where the green light is reflected by the polarized beam splitter surface has been mainly described above, the invention is not limited to the case. Alternatively, a color light of the smallest emission light amount among light of the three primary colors may be reflected by the polarized beam splitter surface or the like. Although the example of using the transmission-type display panel has been described above, a reflection-type display panel (reflection liquid crystal display panel, DMD (Digital Micromirror Device), or the like) can be used (refer to the circle in FIG. 9).

Figure 11:
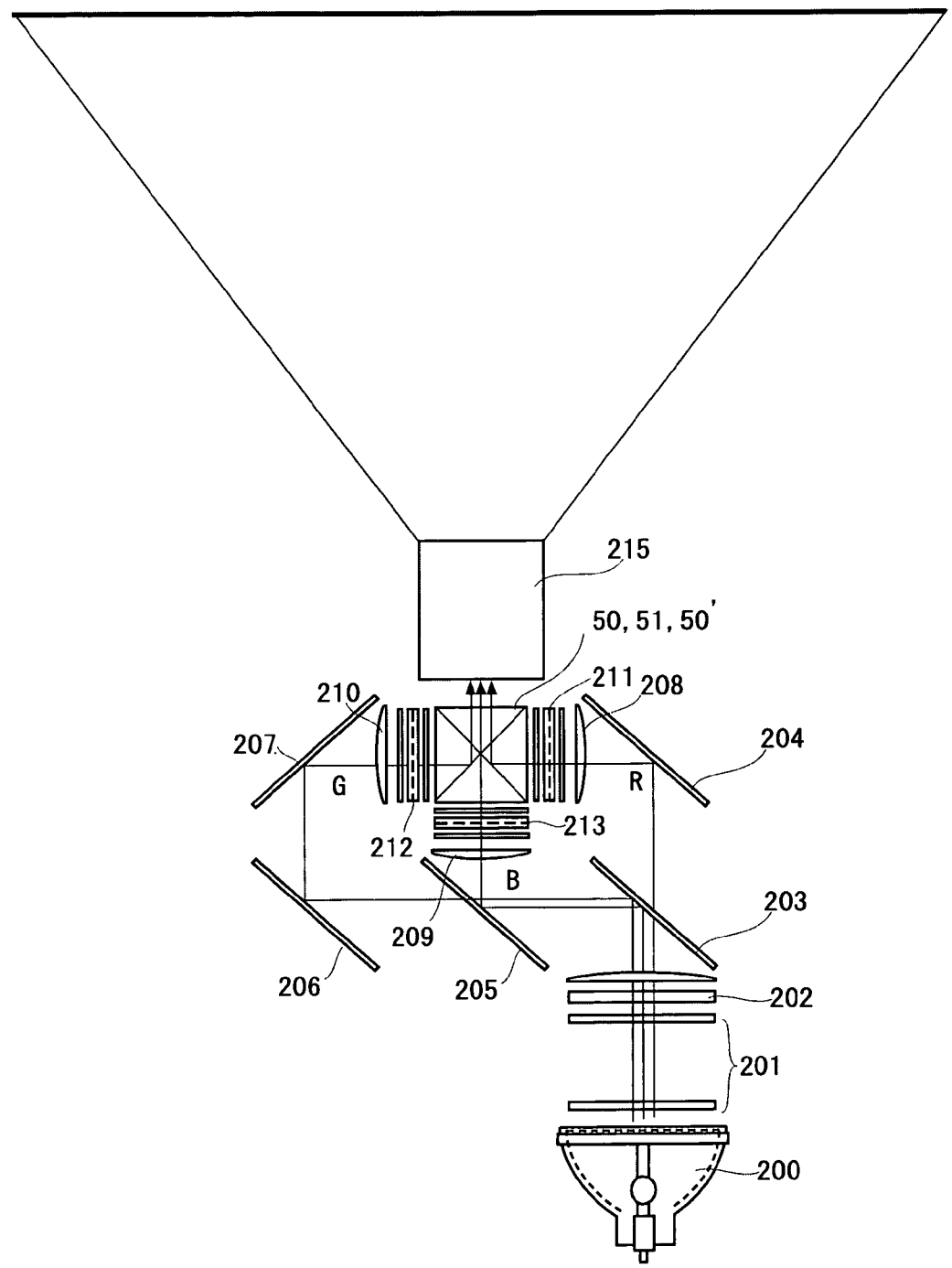
FIG. 11 is a diagram illustrating an illuminating device and a projector of another embodiment of the invention.

FIG. 11 is a diagram illustrating an optical system of the 3-panel color liquid crystal projector having a white light source color split system of the embodiment. A light emission part of a light source 200 is made by an extra-high pressure mercury lamp, a metal halide lamp, a xenon lamp, or the like. Emission light from the light emission part is converted to parallel light by a parabolic reflector, and the parallel light is emitted and led to an integrator lens 201.

The integrator lens 201 is constructed by a pair of fly's eye lenses and each of the pairs of lens parts leading light emitted from the light source 200 to the whole surfaces of liquid crystal light valves 211, 212, and 213. Light which goes out via the integrator lens 201 is led to a first dichroic mirror 203 via a polarization converter 202 formed by a polarized beam splitter array.

The first dichroic mirror 203 transmits light in the red wavelength band and reflects light in the wavelength band of cyan (green+blue). Light in the red wavelength band passed through the first dichroic mirror 203 is reflected by a reflecting mirror 204, thereby changing the optical path. The red light reflected by the reflecting mirror 204 is subjected to light modulation by passing through the liquid crystal light valve 211 of the transmission type for red light via a condenser lens 208. On the other hand, light in the cyan wavelength band reflected by the first dichroic mirror 203 is led to a second dichroic mirror 205.

The second dichroic mirror 205 reflects light in the blue wavelength band and transmits light in the green wavelength band. The light in the blue wavelength band reflected by the second dichroic mirror 205 is subjected to light modulation by being led to the transmission-type liquid crystal light valve 212 for blue light via a condenser lens 209 and passing through the liquid crystal light valve 212. The light in the green wavelength band passed through the second dichroic mirror 205 is subjected to light modulation by being led to the transmission-type liquid crystal light valve 213 for green light via reflecting mirrors 206 and 207 and a condenser lens 210.

Each of the liquid crystal light valves 211, 212, and 213 is formed by an incident-side polarizer, a panel formed by sealing a liquid crystal between a pair of glass substrates (on which a pixel electrode and an alignment layer are formed), and an output-side polarizer. Light (color image light) modulated via the liquid crystal light valves 211, 212, and 213 is combined by the optical element 50 (51), thereby obtaining color image light. The color image light is projected onto a screen by a projection lens 215.

Figure 12:
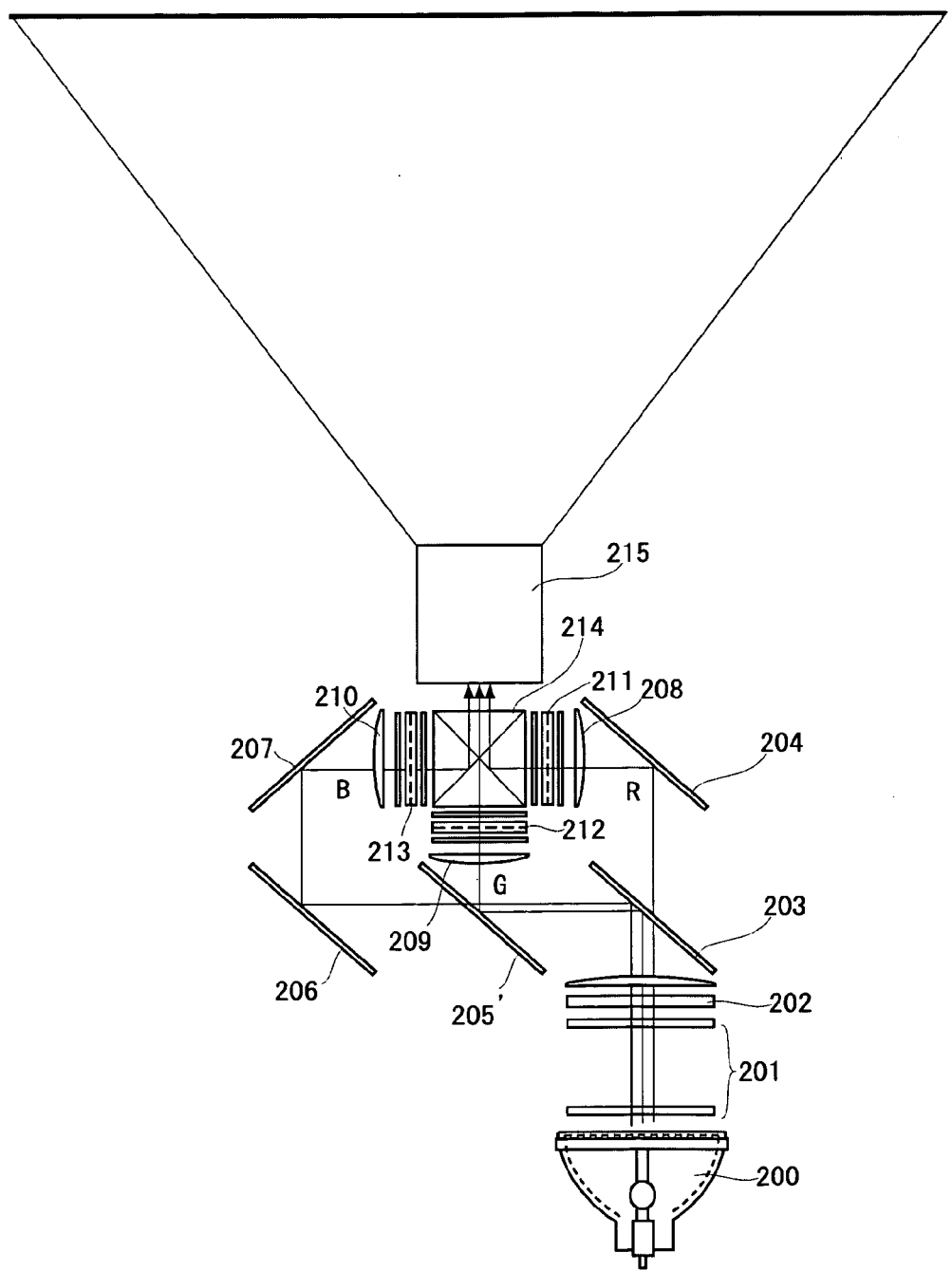
FIG. 12 is a diagram showing a conventional projector as a reference of the projector of FIG. 11.

FIG. 12 illustrates an optical system of a 3-panel color liquid crystal projector including a white light source color split system having the conventional configuration as a reference. The different point between FIGS. 11 and 12 is a point that although the second dichroic mirror in the liquid crystal projector of FIG. 11 reflects blue light and transmits green light, a second dichroic mirror 205' in the liquid crystal projector of FIG. 12 reflects green light and transmits blue light, and a point that although a video combining member in the liquid crystal projector of FIG. 11 is the optical element 50, 51, or 50', a video combining member in the liquid crystal projector of FIG. 12 is a cross dichroic prism 214. To the liquid crystal projector shown in FIG. 11, a technique similar to the technique applied to the liquid crystal projector of FIG. 6 can be also applied.

Second Embodiment

Figure 13:
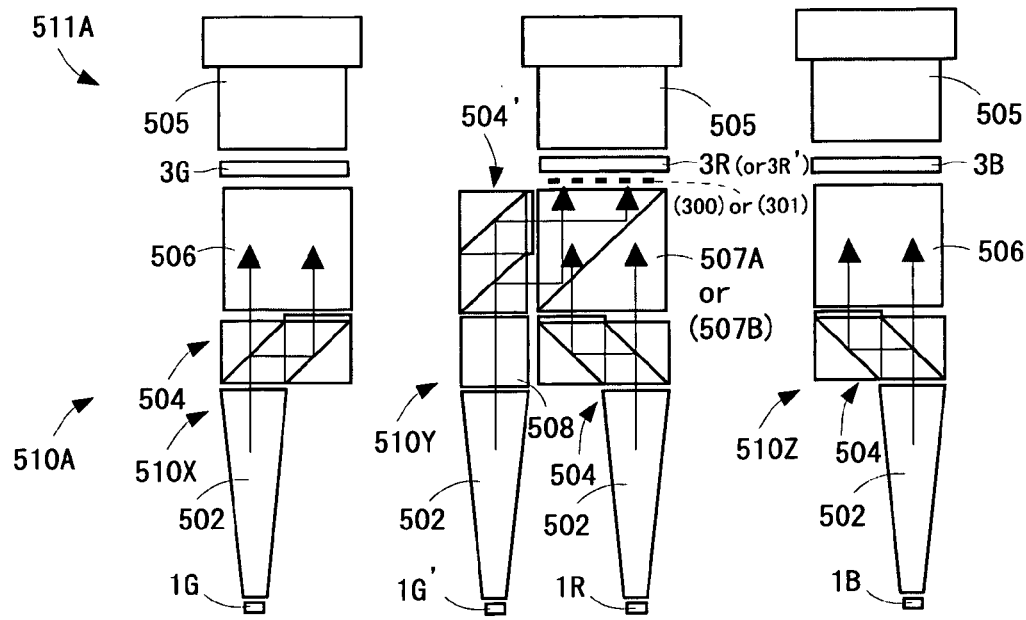
FIG. 13 is a diagram which is helpful to understand a second embodiment of the invention.
Figure 14:
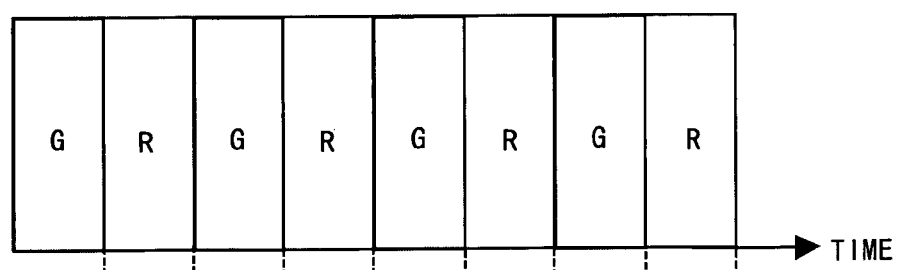
FIG. 14 is a diagram showing color states obtained by time-sequential light emission in the projection type video display illustrated in FIG. 13.
Figure 14:
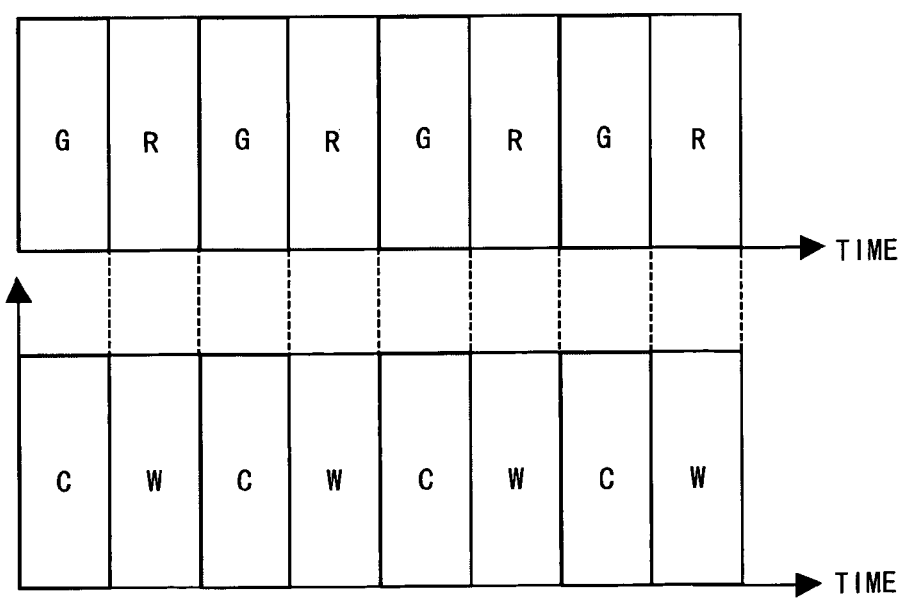

A second embodiment of the present invention will now be described with reference to FIGS. 13 to 17. FIGS. 13 and 14 are not diagrams showing the second embodiment itself (specifically, the projection-type video display device shown in FIG. 13 does not have the optical elements 50 and 51) but are diagrams showing a configuration as a reference which is helpful to understand the second embodiment. First, FIGS. 13 and 14 will be described.

FIG. 13 shows an illuminating device 510A and a projection type video display 511A having the illuminating device 510A. The illuminating device 510A has three lighting units 510X, 510Y, and 510Z for emitting different color lights. The lighting units 510X, 510Y, and 510Z are disposed so that their optical axes are (almost) parallel with each other, and project the color lights onto a not-shown screen.

The lighting unit 510X has a solid light-emitting element (for example, green LED) 1G for emitting green light, a tapered rod 502, a polarization converter (polarization optical element) 504, and a rod 506 for adjusting distance. Light emitted from the solid light-emitting element 1G is subjected to light integration and reduction of the divergence angle by the tapered rod 502. Furthermore, the polarization directions of the light are aligned to the same direction (either P-polarized light or S-polarized light), and the output light passes through the rod 506 and is led to the liquid crystal display panel 3G for green. An integrator rod for uniforming illumination distributions may be provided at a post stage of the distance adjustment rod 506.

The lighting unit 510Z has the solid light-emitting element (for example, blue LED) 1B for emitting blue light, the tapered rod 502, the polarization converter (polarization optical element) 504, and the rod 506 for adjusting distance. Light emitted from the solid light-emitting element 1B is subjected to light integration and reduction of the divergence angle by the tapered rod 502. Furthermore, the polarization directions of the light are aligned by the polarization converter 504 to the same direction (either P-polarized light or S-polarized light), and the output light passes through the rod 506 and is led to the liquid crystal display panel 3B for blue.

The lighting unit 510Y has the solid light-emitting element (for example, red LED) 1R for emitting red light, the tapered rod 502, the polarization converter (polarization optical element) 504, and a dichroic prism (or dichroic mirror) 507A. Furthermore, the lighting unit 510Y has a solid light-emitting element (for example, green LED) 1G' for emitting green light, a tapered rod 502 for green light, a polarization converter for green light (polarization optical element for receiving light from side surfaces and aligning polarized light in the same direction), and a distance adjustment rod 508. That is, the illuminating unit 510Y has the two solid light-emitting elements 1G' and 1R for emitting two pieces of light of different colors (in this example, green light and red light), combines the two color lights (green light and red light) of different colors, and emits the combined light from one light emission side. The lighting unit 510Y is controlled so as to emit the two color lights of different colors in a time-sequential manner (hereinbelow, the lighting unit 510Y may be also called a time-sequential lighting unit Y). In place of a polarization converter 504', the polarization converter 504 may be used. Furthermore, in place of the polarization converter 504 or 504', a reflection-type wire grid type polarized beam splitter may be used. The shape (configuration) of the polarization converter is not limited to the above-described shape (configuration). The above is similarly applied to the following examples.

Green light emitted from the lighting unit 510X passes through the transmission-type liquid crystal display panel 3G for green light and becomes green image light (modulated light). The green image light is projected onto a not-shown screen via a projection lens 505. The solid light-emitting element 1G for emitting green light is always (continuously) on.

Blue light emitted from the lighting unit 510Z passes through the transmission-type liquid crystal display panel 3B for blue light and becomes blue image light (modulated light). The blue image light is projected onto the screen via the projection lens 505. The solid light-emitting element 1B for emitting blue light is always (continuously) on.

In the time-sequential lighting unit 510Y, when the solid light-emitting element 1R is turned on, red light is subjected to light integration and reduction of the divergence angle by the tapered rod 502. Furthermore, the polarization directions of the light are aligned by the polarization converter 504 to the same direction (either P-polarized light or S-polarized light), and the converted light passes through the dichroic prism 507A and is led to the liquid crystal display panel 3R. At this time, a video signal for red is input to the liquid crystal display panel 3R. In such a manner, red image light (modulated light) is obtained. The red image light is projected onto the screen via the projection lens 505. On the other hand, when the solid light-emitting element 1G' is turned on, green light is subjected to light integration and reduction of the divergence angle by the tapered rod 502. Furthermore, the output light passes through the distance adjustment rod 508 and, after that, the polarization directions of the output light are aligned by a polarization converter 504' to the same direction (either P-polarized light or S-polarized light), and the converted light is reflected by the dichroic prism 507A and is led to the liquid crystal display panel 3R. At this time, a video signal for green is input to the liquid crystal display panel 3R. In such a manner, green image light (modulated light) is obtained. The green image light is projected onto the screen via the projection lens 505.

As described above, in the time-sequential lighting unit 510Y, by turning on the solid light-emitting element 1G' with pulses in a time-sequential manner without making the solid light-emitting element 1R always on, the amount of green light in the projection type video display 511A (or the illuminating device 510A) can be increased. Image (a) of FIG. 14 shows a state in which red light (R) and green light (G) in the time-sequential lighting unit 510Y are alternately turned on. Image (b) of FIG. 14 shows image light projected by the projection type video display 511A (on assumption that a white image is displayed). The image light displays the cyan color (C) when green light is emitted from the light source 1G' (when red light is not emitted), and becomes the white color (W) when the red light is emitted (the light source 1G' is not turned on). By adjusting the amount of red light so that the white color becomes lightly reddish, a synthetic white image can be displayed excellently.

In the projection type video display 511A with the configuration, in place of the dichroic prism 507A, a polarized beam splitter 507B may be provided. In this case, the polarization converter 504' is constructed so as to generate green light which is an S-polarized light for the polarized beam splitter 507B. The polarization converter 504 for red light is constructed to generate red light which is a P-polarized light for the polarized beam splitter 507B. In the case of using the polarized beam splitter 507B, a narrow wavelength band polarized light rotating element (300) for turning, for example, the polarization direction of the S-polarized light (green light) by 90° to obtain a P-polarized light is provided on the light emission side of the polarized beam splitter 507B. In the case of interchanging the positions of the light sources 1G' and 1R, the narrow wavelength band polarized light rotating element (300) is not used or the narrow wavelength band polarized light rotating element (300) is disposed for turning the polarization direction of an S-polarized light (red light) to obtain a P-polarized light. By making output image lights polarized lights having the same polarization direction, brightness can be increased in a projection type video display using a polarization screen.

It is also possible to provide a π cell (switching polarized light rotating element) (301) on the light emission side of the polarized beam splitter 507B. The π cell has a structure corresponding to, for example, a structure obtained by eliminating a polarizer in a liquid crystal display panel, and a function state of rotating the polarization direction of incident light by 90 degrees and a function state in which the polarization direction is not rotated are switched by on and off of an energization. For example, in a state where the light source 1R is on, voltage is not applied to the π cell (turn-off state). In this case, the π cell converts the received P-polarized light to the S-polarized light. On the other hand, in a state where the light source 1G' is on, voltage is applied to the π cell (turn-on state). In this case, the π cell transmits the received S-polarized light as it is. As a result, the P-polarized light and S-polarized light from the color light sources in the time-sequential lighting unit are uniformed to one of them (S-polarized light in the above case).

A liquid crystal display panel 3R' may be used in place of the liquid crystal display panel 3R. The structure of the liquid crystal display panel 3R' corresponds to a structure obtained by eliminating the incident-side polarizer from the liquid crystal display panel 3R (refer to FIG. 10). A not-shown LCD driver switches between supply of a video signal in the case where the liquid crystal display panel 3R' is regarded as a liquid crystal display panel of the normally-white type and supply of a video signal in which the liquid crystal display panel 3R' is regarded as a liquid crystal display panel of the normally-black type in accordance with switching timings (switch between a P-polarized light (red light) and an S-polarized light (green light)).

In the following, description will be given more concretely. In the following description, it is assumed that the output-side polarizer of the liquid crystal display panel 3R' transmits an S-polarized light. At a timing when the red light source 1R is on and a P-polarized light is emitted, the LCD driver supplies the red video signal for the normally-white type to the liquid crystal display panel 3R'. When a video signal corresponding to 100% of red is supplied to the liquid crystal display panel 3R' (that is, current is not passed to the pixels in the liquid crystal display panel 3R'), the polarization direction of the P-polarized light incident on the liquid crystal display panel 3R' is turned by 90°, thereby obtaining an S-polarized light, so that the output light can pass through the output-side polarizer, and an image of 100% red is displayed. On the other hand, at a timing when the green light source 1G' is turned on and an S-polarized light is emitted, the LCD driver supplies a video signal for the normally-black type to the liquid crystal display panel 3R'. When a video signal corresponding to 100% of green is supplied to the liquid crystal display panel 3R' (that is, current is passed to the pixels in the liquid crystal display panel 3R'), the polarization direction of the S-polarized light incident on the liquid crystal display panel 3R' does not rotate, so that the output light can pass through the output-side polarizer and an image of 100% of green is displayed.

Figure 15:
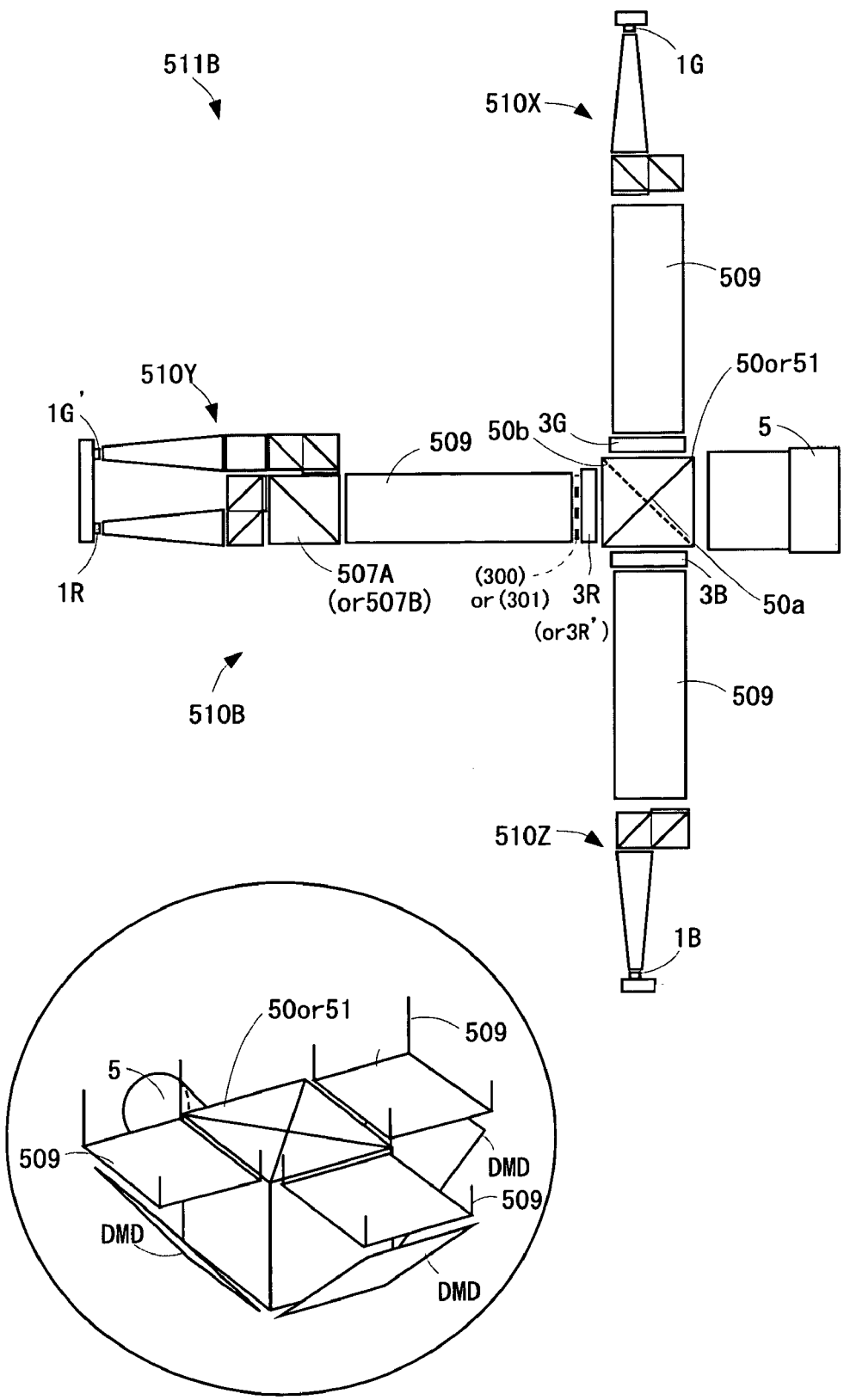
FIG. 15 is a diagram illustrating an illuminating device and a projection type video display of the second embodiment of the invention.

A second embodiment will now be described below. FIG. 15 is a diagram illustrating a projection type video display 511B according to the second embodiment. In the projection type video display 511B, the three transmission-type liquid crystal display panels 3G, 3R, and 3B are disposed so as to face three light incidence surfaces of the optical element 50 (or optical element 51). That is, the projection type video display 511B has a structure obtained by combining the lighting units 510X, 510Y, and 510Z shown in FIG. 13 and the optical element 50 (or optical element 51). Obviously, the optical element 50' can be used in place of the optical elements 50 and 51.

In the projection type video display 511B shown in FIG. 15, in this case, the lighting unit 510X has a rod integrator 509 which integrates again green light subjected to the integration in the tapered rod 502 and leads the output light to the liquid crystal display panel 3G. In this case, the lighting unit 510Y has a rod integrator 509 which integrates again green light or red light subjected to the integration in the tapered rod 502 and leads the output light to the liquid crystal display panel 3R. In this example, the lighting unit 510Z has a rod integrator 509 which integrates again blue light subjected to the integration by the tapered rod 502 and leads the output light to the liquid crystal display panel 3B.

The green light from the lighting unit 510X is led in a state of predetermined polarization light to the liquid crystal display panel 3G. The green image light (S-polarized light) obtained by passing through the liquid crystal display panel 3G is reflected by the polarized beam splitter surface 50b and led to the projection lens 5. The lighting unit 510X is always (continuously) on. Blue light from the lighting unit 510Z is led in a state of predetermined polarization light to the liquid crystal display panel 3B. The blue image light (S-polarized light or P-polarized light) obtained by passing through the liquid crystal display panel 3B is reflected by the dichroic surface 50a and led to the projection lens 5. The lighting unit 510Z is always (continuously) on.

When the light source 1G' of the time-sequential lighting unit 510Y is turned on, a video signal for green light is supplied to the liquid crystal display panel 3R. When the green light is led, for example, in a state of S-polarized light to the liquid crystal display panel 3R, red light from the time-sequential lighting unit 510Y is also led to the liquid crystal display panel 3R in a state of an S-polarized light (the case of using the polarized beam splitter 507B will be described later). In this case, a video signal for red light is supplied to the liquid crystal display panel 3R. In the case where the modulated green light (green image light) is an S-polarized light, the light cannot pass through the optical element 50. For example, it is sufficient to dispose the π cell on the light emission side of the liquid crystal display panel 3R and convert the modulated green light to a P-polarized light at the turn-on timing of the light source 1G'. Alternatively, a narrow wavelength polarized light rotating element for turning the polarization direction of only green light by 90 degrees may be disposed on the light emission side of the liquid crystal display panel 3R. In the case where the modulated green light (green image light) is a P-polarized light, the light can pass through the optical element 50. The green image light and the red image light obtained via the liquid crystal display panel 3R passes through the dichroic surface 50a and the polarized beam splitter surface 50b and is led to the projection lens 5.

It is now assumed that color lights (time-sequential turn-on light) from the color LEDs are combined by a normal dichroic prism (refer to the dichroic prism 214 in FIG. 12). As parameters of time-sequential turn-on, current to be passed is doubled at the duty of 50% and the light amount is increased by 1.5 times. In this case, the proportion of light amounts of the color lights emitted from the dichroic prism is simply R:G:B=1:1:1. When it is assumed that the green light is insufficient and the number of green LEDs is doubled, the light amount of green light increases by about 1.5 times. In this case, the proportion of light amounts of the color lights emitted from the dichroic prism is R:G:B=1:1.5:1. As shown in FIG. 15, when it is assumed that red light and green light from the time-sequential lighting unit 510Y is combined by the optical element 50 in addition to the green light from the lighting unit 510X, the proportion of the light amounts of the color lights output from the optical element 50 is R:G:B=0.75:1.75:1. When a red LED, a green LED, and a blue LED have the same chip size, there is a case that the light amount ratio becomes, for example, R:G:B=5:4:1. When such an LED set and the optical element 50 are combined, the proportion of the light amounts actually obtained is R:G:B=0.75×5:1.75×4:1×1 is almost equal to 3.75:7:1.

In the case of using the optical element 50' in place of the optical element 50 in the projection type video display 511B, it is set so that blue image light of the P-polarized light is emitted from the liquid crystal display panel 3B, and green image light of the P-polarized light and red image light of the P-polarized light are emitted from the liquid crystal display panel 3R.

In the case of using the polarized beam splitter 507B in place of the dichroic prism 507A in the time-sequential lighting unit 510Y, the narrow wavelength band polarized light rotating element (300) is disposed, for example, on the light incidence side of the liquid crystal display panel 3R so that the polarization directions of green and red light illuminated to the liquid crystal display panel 3R are set to the same. Obviously, by providing the π cell (301) or the like, the polarization directions of green and red light illuminated to the liquid crystal display panel 3R can be set to the same.

In the projection type video display 511B, reflection-type display panels (such as DMDs) can be also used in place of the liquid crystal display panels (refer to the circle in FIG. 15). As long as the reflection-type display panel is of a type which is not limited to a polarization direction, an advantage such that the π cell or the narrow wavelength band polarized light rotating element is unnecessary may be obtained.

Figure 16:
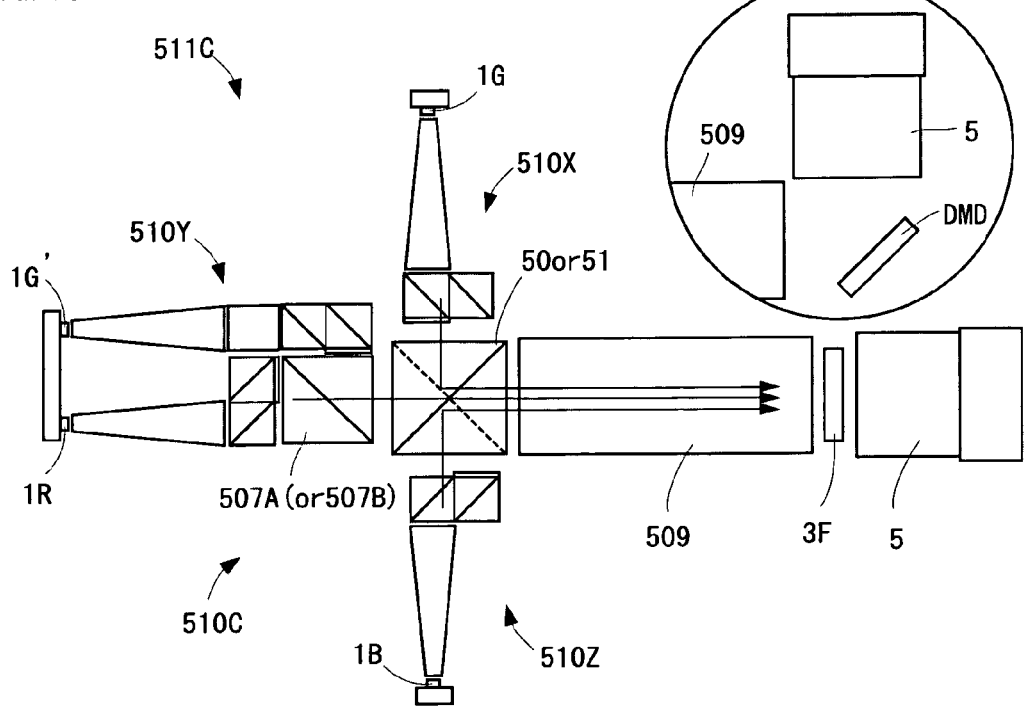
FIG. 16 is a diagram illustrating another example of the illuminating device and the projection type video display of the second embodiment.

FIG. 16 is a diagram illustrating an illuminating device 510C and a projection type video display 511C. The projection type video display 511C is of a single-panel type. The illuminating device 510C is constructed by the above-described lighting units 510X, 510Y, and 510Z and the optical element 50 having a cube shape (or the optical element 51 having a cross shape). The lighting units 510X and 510Z are disposed so as to face each other while sandwiching side surfaces of the optical element 50, and the time-sequential lighting unit 510Y and the rod integrator 509 are disposed so as to face each other while sandwiching the other side surfaces of the optical element 50. The surface of the optical element 50 surfaced on the rod integrator 509 is the light emission surface, and the other three surfaces are light incident surfaces. The lighting units 510X, 510Y, and 510Z are driven in a time-sequential manner. On the light emission side of the rod integrator 509, the liquid crystal display panel 3F which is driven in a time-sequential manner is disposed. The projection lens 5 projects light modulated by the liquid crystal display panel 3F.

Figure 17:
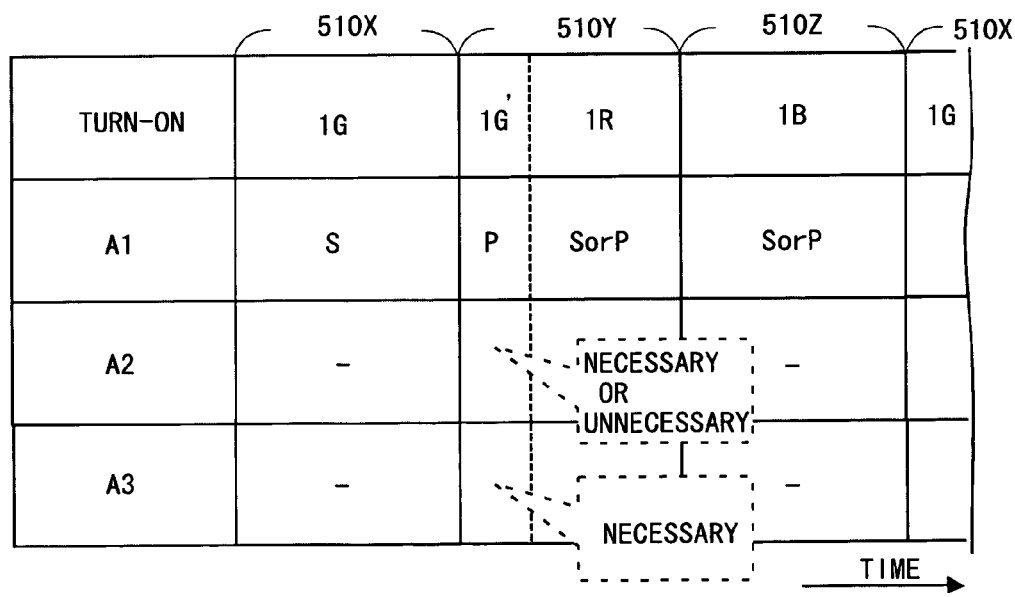
FIG. 17 is a diagram showing turn-on timings of lighting units etc., in the projection type video display in FIG. 16.

As shown in FIG. 17, operation of turning on illuminating devices by pulses is repeated in order of, for example, the illuminating device 510X (turn-on of the light source 1G), the time-sequential lighting unit 510Y (time-sequential turn-on of the light sources 1G' and 1R), the lighting unit 510Z (turn-on of the light source 1B), the illuminating device 510X (turn-on of the light source 1G), and so on. For example, when or just before the light source 1G is turned off, the light source 1G' is turned on. When or just before the light source 1G' is turned off, the light source 1R is turned on. When or just before the light source 1R is turned off, the light source 1B is turned on. When or just before the light source 1B is turned off, the light source 1G is turned on.

The liquid crystal display panel 3F performs light modulation on the video signal for green also after the light source 1G is turned off so that the state where the green image light is projected using green light from the light source 1G' is maintained. Since the light at the time of peak of the light source 1G and the light at the time of peak of the light source 1G' can be obtained, the light amount can be increased to be larger than that in the case of simply increasing pulse turn-on time of the light source 1G.

Also when the light sources 1G and 1G' are simultaneously turned on, it is necessary to make their polarization directions different from each other. Therefore, the green light from both of the light sources cannot be used in the liquid crystal display panel 3F. In the case of using, for example, a digital micromirror device (DMD) or the like in place of the liquid crystal display panel 3F (refer to the circle in FIG. 16), the polarization directions may be any directions, so that a control of simultaneously turning on the light sources 1G and 1G' may be performed.

In the projection type video display 511C, the optical element 50' can be also used. In the case of using the polarized beam splitter 507B in place of the dichroic prism 507A in the illuminating device 510C, green light from the light source 1G' in the time-sequential lighting unit 510Y has to be made an S-polarized light. Since green light as an S-polarized light cannot pass through the optical element 50 and the like, the green light is converted to a P-polarized light by using, for example, a π cell or a narrow-wavelength band polarized light rotating element, and the converted green light is led to the optical element 50 or the like. The position of the light source 1G' and that of the light source 1R can be interchanged. In the case of interchanging the position of the light source 1G' and that of the light source 1R, green light from the light source 1G' in the time-sequential lighting unit 510Y can be made a P-polarized light.

Although the polarization converter 504 is used in the above description, the polarization converter 103S or 103P can be used. Although the configuration in which green light is emitted from the light sources 1G and 1G' has been described, the invention is not limited to the configuration. Another configuration may be used in which color light of the smallest emission light amount among the three primary color lights is emitted from two light sources, and one of the light sources and the other color light source may emit the color lights in a time-sequential manner.

The present invention has been described in detail with reference to the drawings, the invention has been described using the diagrams and examples and, obviously, the invention is not limited to those. The sprit and scope of the present invention are limited only by the terms in the appended claims.

What is claimed is:

1. An optical element comprising:
a dichroic surface that transmits, out of light of a first color, light of a second color, and light of a third color which are different in color from one another, the light of the first color and the light of the second color and reflects the light of the third color, thereby leading the light of the first color and the light of the third color out of the light of the three colors to a specific optical path;
a polarized beam splitter surface that transmits, out of a first polarized light and a second polarized light of which polarization directions are orthogonal to each other, the first polarized light and reflects the second polarized light; and
three incident surfaces from which the light of the first color, the light of the second color and the light of the third color are respectively incident,
wherein the dichroic surface and the polarized beam splitter surface being disposed so as to cross each other,
wherein the light of the second color of the second polarized light is led to the specific optical path by the polarized beam splitter surface.

2. An optical element comprising:
a dichroic surface that transmits, out of light of a first color, light of a second color, and light of a third color which are different in color from one another, the light of the first color and the light of the second color and reflects the light of the third color, thereby leading the light of the first color and the light of the third color out of the light of the three colors to a specific optical path;
a polarized beam splitter surface that transmits, out of a first polarized light and a second polarized light of which polarization directions are orthogonal to each other, the first polarized light and reflects the second polarized light; and three incident surfaces from which the light of the first color, the light of the second color and the light of the third color are respectively incident, wherein the dichroic surface and the polarized beam splitter surface being disposed so as to cross each other, wherein the polarized beam splitter surface functions as a polarized beam splitter only for the light of the second color, thereby leading the light of the second color of the second polarized light to the specific optical path and, even when the light of the first color and the light of the third color are the second polarized lights, the light of the first color and the light of the third color pass through the polarized beam splitter surface and travel to the specific optical path.

3. The optical element according to claim 1, wherein each of the three incidence surfaces is vertical to at least one of the other two incidence surfaces.

4. The optical element according to claim 2, wherein each of the three incidence surfaces is vertical to at least one of the other two incidence surfaces.

* * * * *